Jan. 28, 1964  T. F. BARRY ETAL  3,119,434
METHOD AND APPARATUS FOR CABLE PRESTRESSING
Filed Feb. 6, 1961  5 Sheets-Sheet 1
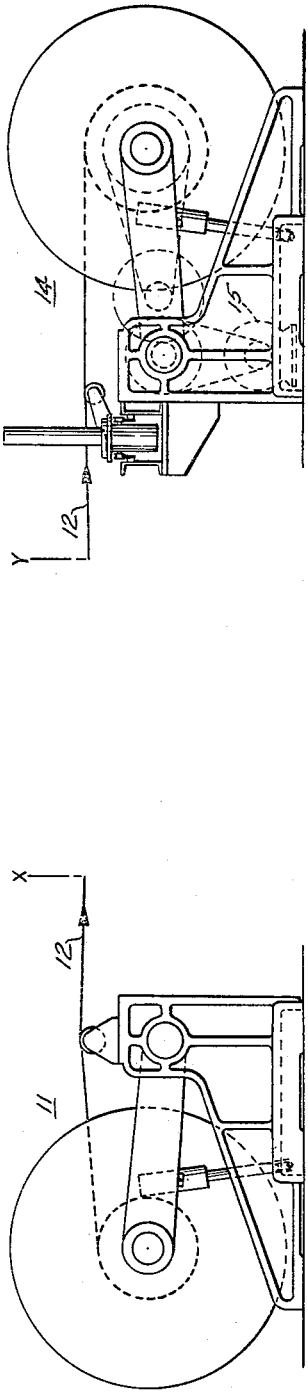
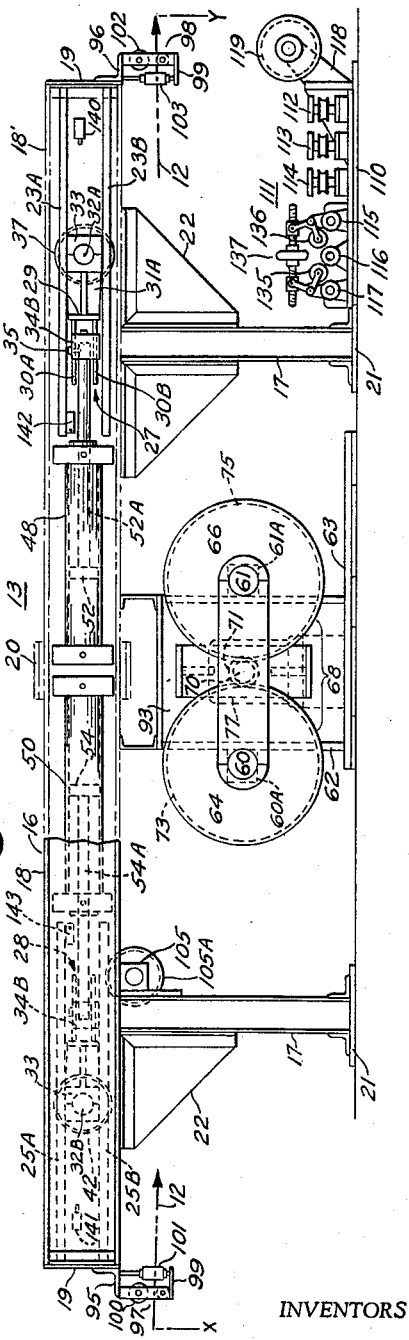
Fig. 1
INVENTORS
Thomas F. Barry
J Wier Smith
BY Natt M Emery Jr.
ATTORNEY Jan. 28, 1964  T. F. BARRY ETAL  3,119,434
METHOD AND APPARATUS FOR CABLE PRESTRESSING
Filed Feb. 6, 1961  5 Sheets-Sheet 2
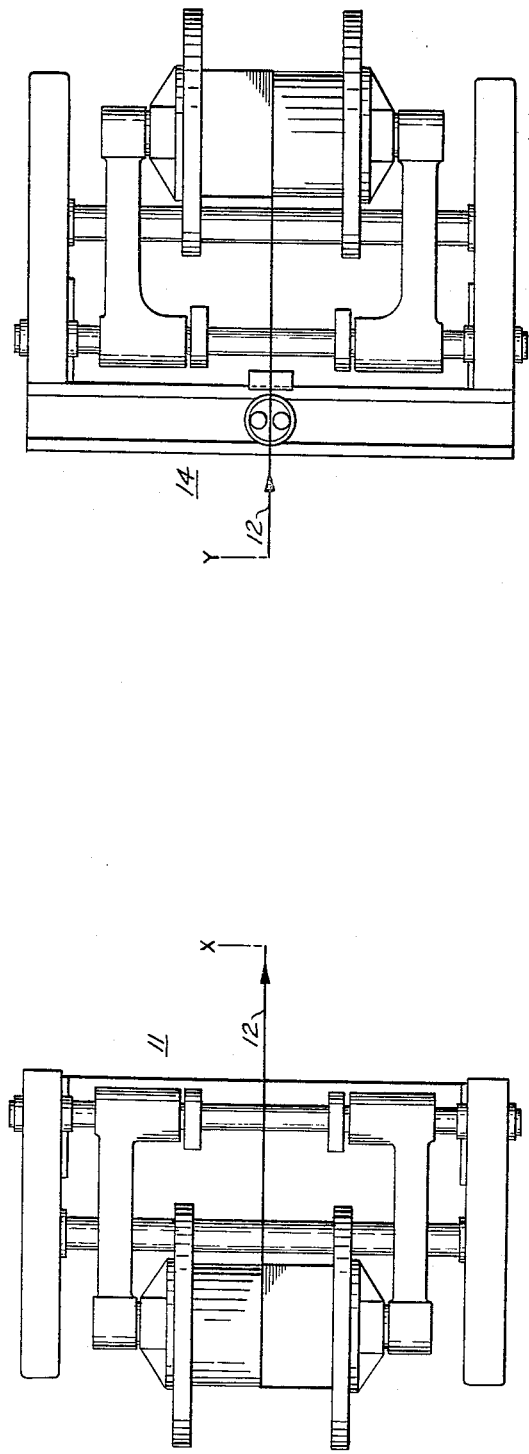
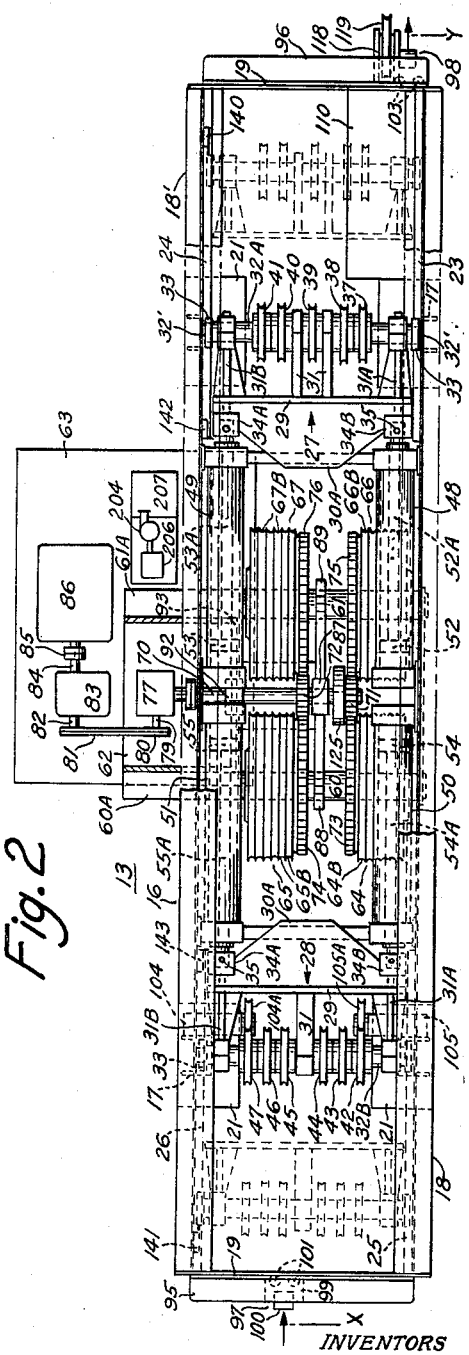
Fig. 2
INVENTORS
Thomas F. Barry
J Wier Smith
BY Natt M Emery Jr.
ATTORNEY INVENTORS
Thomas F. Barry
J Wier Smith
BY Natt M Emery Jr.
ATTORNEY United States Patent Office 3,119,434
Patented Jan. 28, 1964

3,119,434
METHOD AND APPARATUS FOR CABLE PRESTRESSING
Thomas F. Barry, Williamsport, and J Wier Smith, Montoursville, Pa., assignors to Bethlehem Steel Company, a corporation of Pennsylvania
Filed Feb. 6, 1961, Ser. No. 87,290
11 Claims. (Cl. 153—35)

This invention relates to a method and means for prestressing wire rope or cable and more particularly to an improved method and apparatus for continuously prestressing long lengths of wire rope or cable.

Wire rope or cable may be prestressed to remove the constructional stretch after stranding, that is to urge the separate strands of the cable into a smooth and compact relationship with one another. The prestressing is accomplished in manufacture by subjecting the cable to a predetermined load for a sufficient length of time to permit permanent adjustment of the component parts to the load.

It is an object of the present invention therefore to provide a method and apparatus for subjecting successive increments of a long wire cable or rope to a uniform predetermined stress.

A further object of the invention is to provide a method and apparatus for prestressing wire cable which involves passing the cable progressively around and past two capstans or snubbers rotating at equal peripheral speeds and a tensioning device located in the path of the cable as it passes from one capstan to the other capstan and continuously applying a predetermined pressure to the cable as it passes from one capstan or snubber to the other capstan or snubber so that successive increments of the whole cable are subjected to a predetermined tension as it passes through the apparatus whereby the whole cable may be quickly and effectively prestressed to remove the constructional stretch therefrom.

A still further object of the present invention is to provide a method and apparatus of prestressing wire cable involving passing a long length of wire cable continuously around two capstans or snubbers rotating at equal peripheral speeds, passing the cable between the capstans or snubbers in multiple loops around guide means and applying a predetermined pressure to the loops to obtain a predetermined degree of tension and flexing under tension progressively to successive portions of the cable.

A still further object of the present invention is to provide a method and apparatus for prestressing wire cable in which the cable is passed around two sets of sheaves, one of which sets contains more sheaves than the other, mounted upon two relatively movable carriages operatively positioned between snubbing capstans and urged away from each other by dynamically balanced constant force applying means.

Essentially, the present invention comprises snubbing capstans for continuously feeding cable to and continuously receiving cable from a tensioning device in which successive increments of the cable are stretched and stored, the capstans being continuously operated at the same peripheral speeds so that the cable is supplied to and removed from the device at the same rate regardless of the amount by which the cable is lengthened in the tensioning device. Preferably, the cable after it leaves the first capstan and before it reaches the second capstan is passed in the form of a series of loops around two sets of movable sheaves which progressively flex the cable. Means are arranged to move the sets of sheaves relative to one another and to apply a constant predetermined pressure to the cable between the capstans so that as the cable is continuously passed between the capstans the cable will be subjected to a predetermined tension and elongated, and the amount by which the cable is elongated is accumulated between the sheaves.

The present invention has been found particularly useful in prestressing load carrying cables or ropes which comprise an inner and outer layer, the outer layer being wound with a left lay and the inner layer being wound with a right lay, or vice versa. The purpose of the two oppositely wound layers, as is well known in the art, is to counteract, the twisting tendency of each, i.e., to provide a cable having a minimum tendency to rotate under load. These multiple layers, however, after stranding, may have considerable structural inequalities and it is necessary to prestress them thoroughly in order to induce the various wires of the layers to lie easily and closely together. Sufficient tension is applied to the cable to remove at least the constructional stretch. It will be understood, however, that this method and apparatus may also be advantageously used for the prestressing of other types of wire cable or strand. Nor is the present invention limited to removing the constructional stretch from wire cable but is adaptable also to otherwise prestressing wire strands or cables.

Other objects and advantages will be made apparent from the following description of the invention in connection with the following drawings wherein like numbers refer to the same parts, and in which:

FIGURE 1 is an elevational view, partly broken away of an embodiment of an apparatus for practicing the invention.

FIGURE 2 is a top plan view of the apparatus shown in FIG. 1.

Figure 3:
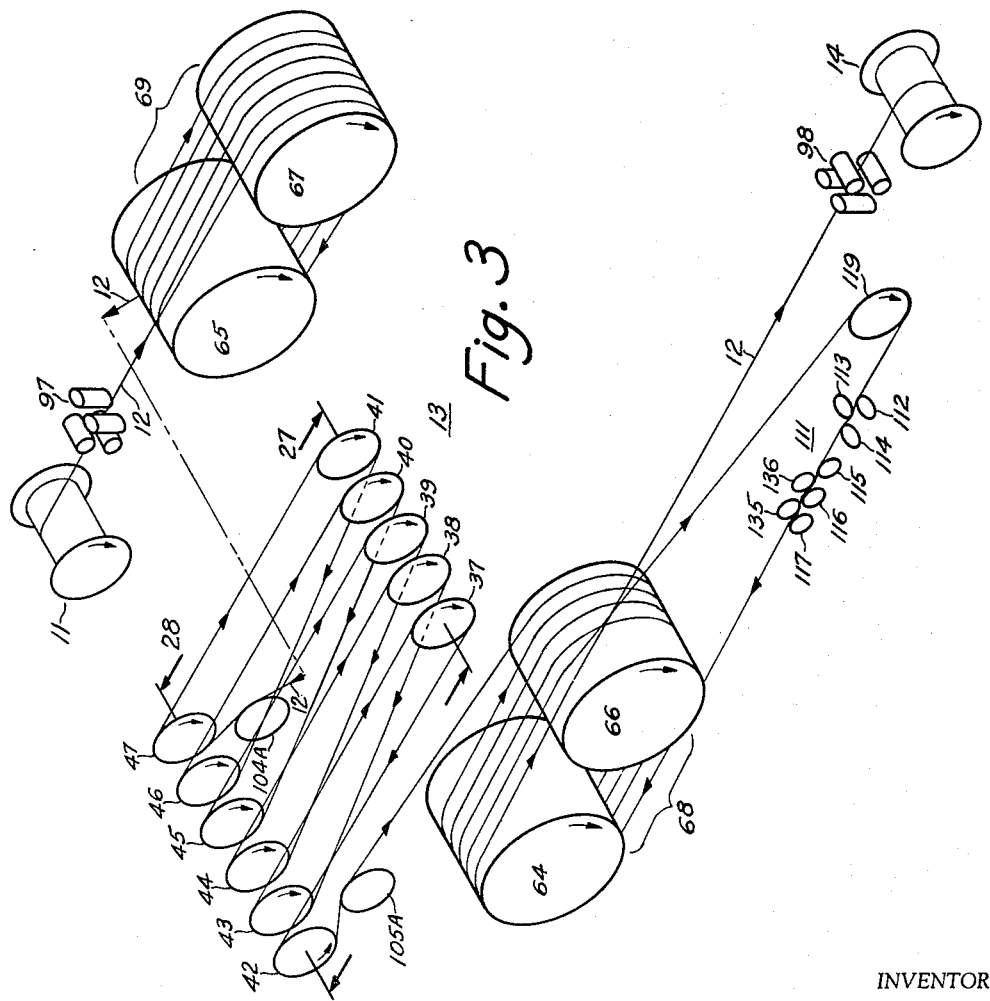
FIGURE 3 is a schematic view in isometric form of the path of a cable through the apparatus.

In FIGS. 1 and 2, reference numeral 11 generally designates a wire cable pay-off apparatus on which a cable reel may be mounted to pay-off cable 12 to be prestressed to a prestressing apparatus generally indicated at 13. The cable 12 after passing through the prestresser 13 passes to a take-up assembly generally indicated by 14 which comprises a revolvable reel to take up and store the prestressed cable. The reel of take-up 14 may be driven by an electric motor 15 through a slipping clutch assembly not shown. It should be noted that in FIGURES 1 and 2 pay-off 11 and take-up 14 are shown displaced from their normal positions at the ends of the prestressing apparatus 13.

In the illustrated embodiment of the present invention prestresser 13 comprises a frame generally indicated as 16, having supporting legs 17 upon which are supported longitudinal beams 18 and 18' tied together by cross plates 19 at the ends and 20 in the center of the prestresser frame 16. Support legs 17 stand on bases 21. The junctions between legs 17 and longitudinal beams 18 and 18' are reinforced by brackets 22. Longitudinal beams 18 and 18' are ordinary I-beams. The inside of the I's toward the ends thereof support pairs of tracks 23, 24, 25 and 26 each consisting of two track members as for instance 23A and 23B on which run carriage assemblies 27 and 28.

Carriage assemblies 27 and 28 both comprise a transverse vertical plate member 29, two transverse truncated triangular shaped heavy plate sections 30A and 30B welded to the back of said plate member 29, several heavy cast shaft supporting arms 31 welded to the front of said plate member 29, and a shaft 32 supported by the shaft supporting arms 31. The shaft on carriage 27 will be referred to as shaft 32A and the shaft on carriage 28 will be referred to as shaft 32B. The two outer shaft supporting arms indicated as 31A and 31B also support greased slide blocks 33 on extensions 32' of shafts 32. The slide blocks 33 slide between and against the track members of tracks 23, 24, 25 and 26. Welded to the rear of the triangular plates 30A and 30B on both sides are heavy box-like brackets 34A and 34B. Journaled upon shaft 32A are sheaves 37, 38, 39, 40 and 41 and journaled on shaft 32B are sheaves 42, 43, 44, 45, 46 and 47. Four hydraulic cylinders 48, 49, 50 and 51 lie partly within the central portions of the inside of the I-beams forming the longitudinal beams 18 and 18' in the parts not occupied by the pair of tracks 23, 24, 25 and 26. Extending from cylinders 48, 49, 50 and 51 are piston rods 52A, 53A, 54A and 55A attached to corresponding pistons 52, 53, 54 and 55 which are mounted within the respective cylinders 48, 49, 50 and 51. The ends of piston rods 52A, 53A, 54A and 55A are connected by means of pins 35 to the box-like brackets 34A and 34B which are mounted upon the sides of the heavy plate members 30A and 30B on each of the carriage assemblies 27 and 28. Piston rods 52A and 53A are connected to the brackets 34B and 34A of carriage 27 by means of pins 35 in order that when pistons 52 and 53 are moved outwardly or extended their extension will force carriage assembly 27 along tracks 23 and 24 as shown in dotted lines in FIGURE 2 and when pistons 52 and 53 are moved inwardly or retracted carriage assembly 27 will be drawn back to the position in which it is shown in solid lines in FIGURE 2. It will be understood that the extension or retraction of pistons 54 and 55 will move carriage assembly 28 in a similar manner.

Mounted beneath the central portion of frame 16 are two round stationary shafts 60 and 61 each of which has a square section 60A and 61A respectively at its inner end rigidly attached to a supporting box-like structure indicated generally as 62 so that the stationary shafts 60 and 61 are supported by one end in cantilever fashion. Box-like structure 62 is mounted upon a base 63. Journaled upon the cantilevered end section of shaft 60 are two capstan drums 64 and 65 and journaled on the cantilevered end section of shaft 61 are two other capstan drums 66 and 67. In operation, drum 64 on shaft 60 and drum 66 on shaft 61 may be considered as one double drum capstan hereafter referred to as capstan 68, and drum 65 on shaft 60 and drum 67 on shaft 61 may be considered as another double drum capstan hereafter referred to as capstan 69.

Capstans 68 and 69 may be driven in any suitable manner. In the present embodiment all four capstan drums 64, 65, 66 and 67 are shown of the same size and therefore when they are driven from a single source through like gearing all four drums will be driven at the same peripheral speed. As shown in FIGS. 1 and 2, this is done by a shaft 70 located between the four combined drums of capstans 68 and 69. Two equal sized pinions 71 and 72 are mounted on shaft 70 and each of the four capstan drums 64, 65, 66 and 67 has a concentric gear face cut into or secured to one edge to form equal diameter gears 73, 74, 75 and 76. Gears 73 and 75 of capstan 68 mesh with pinion 71 and gears 74 and 76 of capstan 69 mesh with pinion 72 on shaft 70. Thus as shaft 70 rotates, the four capstan drums 64, 65, 66 and 67, all being of equal diameter, will rotate at equal peripheral speeds through the agency of the equal diameter pinions 71 and 72 and the equal diameter gears 73, 74, 75 and 76 secured to the four capstan drums.

Shaft 70 may be driven in any convenient manner but in the embodiment shown is driven through a worm and gear reducer 77, which is in turn driven by shaft 79 which has a pulley 80 secured on its opposite end. Pulley 80 is driven by a belt 81 which is driven by a pulley on the end of a shaft 82 of a 3-speed gear transmission 83 which is in turn driven through the agency of shaft 84 and coupling 85 from an electric motor 86. The gear reducer 77, transmission 83 and motor 86 may all be secured to base 63 which in turn may be secured to the floor, but it will be understood that such details are a matter of choice and any other suitable arrangement may easily be substituted. Shaft 70 is journaled in bearings 87 mounted between the capstans 68 and 69 in the center of tie bars 88 and 89 which tie shafts 60 and 61 rigidly together. Shaft 70 is also journaled in bearings 92 mounted on a plate member 93 of the box-like supporting structure 62.

Secured along and stiffening the end cross plates 19 of the prestresser are brackets 95 and 96. Depending from brackets 95 and 96 are cable guides 97 and 98 each comprising a supporting frame indicated generally as 99 and two pairs of rollers 100, 101 and 102, 103 rotatably mounted in the supporting frames 99 and between which the cable is passed so it will be guided, as seen in FIGS. 1 and 2, into and out of the prestresser respectively.

Mounted upon bracket 104 is guide sheave 104A for guiding cable 12 from the capstan drum 65 to the sheave 47 on carriage 28 and mounted upon bracket 105 is guide sheave 105A for guiding the cable 12 from sheave 42 on carriage 28 to capstan drum 64.

Mounted upon an extension 110 of base 21 of one of the legs 17 is a straightener generally indicated as 111. The straightener 111 consists essentially of 3 offset sheaves 112, 113 and 114 mounted on vertical axes and 5 offset sheaves 115, 135, 116, 136 and 117 mounted on horizontal axes as is well known in the art of wire and cable straightening. The position of sheaves 135 and 136 is adjustable by mechanism 137 or any other device as well known in the art to vary the flexure of the cable. At the outer end of base extension 110 is a bracket 118 upon which is journaled a large guide sheave 119.

Upon the base 63 may also be mounted hydraulic pump 204 and tank or reservoir 207, and an electric motor 206 is provided to drive the hydraulic pump 204.

Pinion 71 which drives capstan drums 64 and 66 constituting capstan 68 is shown secured to shaft 70 through the agency of a clutch generally indicated as 125. The clutch 125 is provided to allow capstan 68 to be freely operated independently of drive shaft 70 by pull on the cable during retraction of carriages 27 and 28 when it is desired to remove the cable therefrom by the take-up mechanism 14. Take-up 14 will then operate while capstan drive shaft 70 is stationary, and capstan 68 will be free to revolve to allow the take-up 14 to pull the prestressed cable 12 around and past capstan 68 and take up the cable from the carriages 27 and 28.

At the outer end of traverse of carriages 27 and 28 are outer trip limit switches 140 and 141, respectively, mounted on the beam 18', and at the inner end of traverse of carriages 27 and 28 are inner trip limit switches 142 and 143, respectively, mounted on beam 18'. Limit switches 140, 141, 142 and 143 are so mounted that they will be tripped by the carriages 27 and 28 when the carriages approach their limits.

Figure 4:
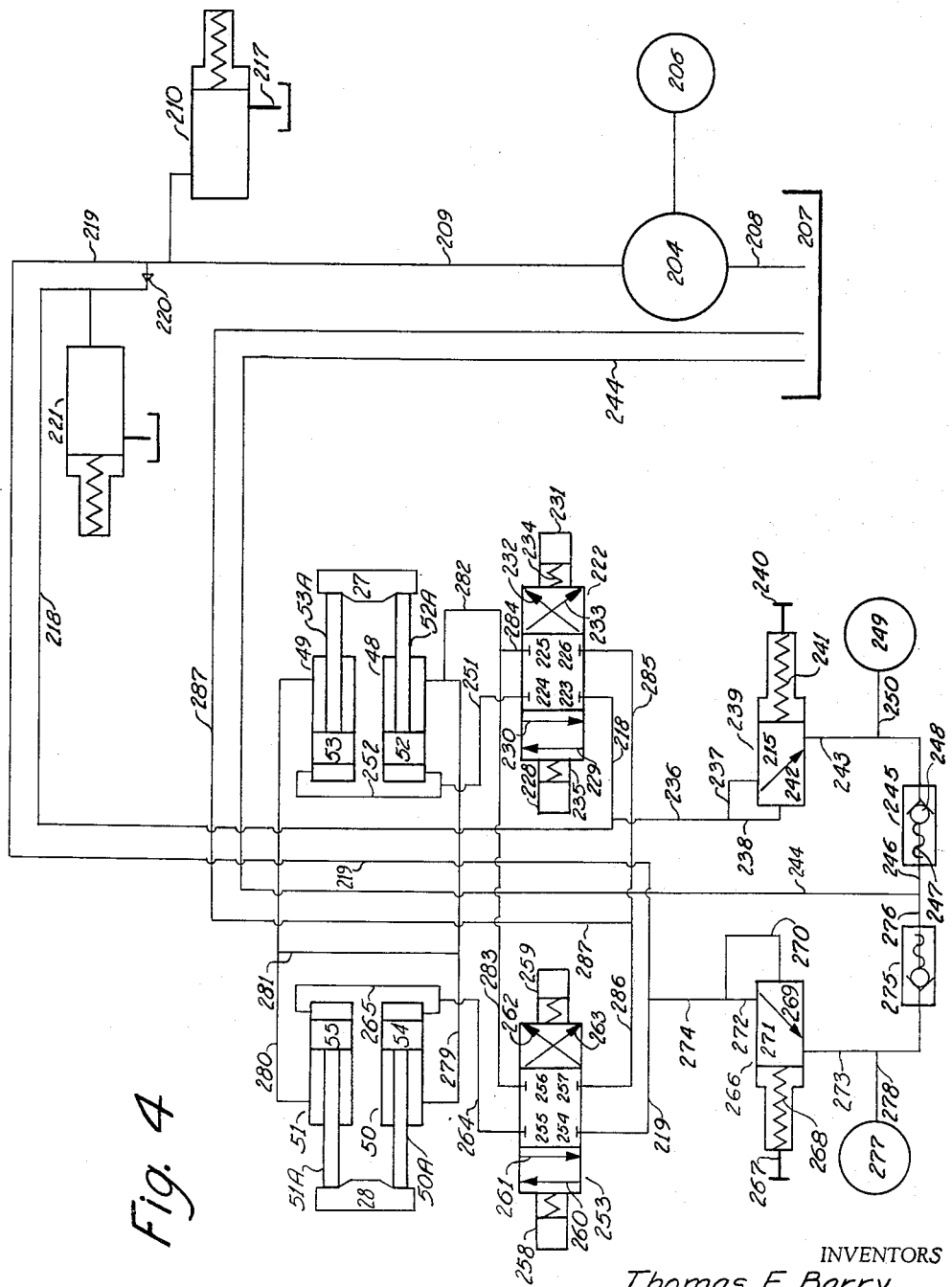
FIGURE 4 is a diagrammatic outline of the hydraulic control system for use with the apparatus shown in FIGS. 1 and 2 for applying constant tension to the cable.

Associated with the prestresser as shown in FIGS. 1 and 2 is the control system diagrammatically shown in FIG. 4. This control system as shown comprises primarily a hydraulic system for operating the carriage assemblies 27 and 28 through the medium of the four cylinders 48, 49, 50 and 51 and their respective pistons 52, 53, 54 and 55.

It will be noted in FIGS. 1 and 2 that carriage assembly 27 has five sheaves mounted upon it while carriage assembly 28 has six sheaves mounted thereon around and between which the cable is passed during prestressing and which move apart to tension and prestress the cable. An odd number of sheaves are used on one carriage and an even number of sheaves are used on the other carriage in order to attain better balance of the prestresser. This, however, necessitates that a higher total pressure be placed upon the carriage assembly 28 with the six sheaves than upon the carriage assembly 27 with the five sheaves in order that both sets of sheaves may move outwardly at equal rates during the operation of the machine. Two separate fluid lines 219 and 218 are required so that the different pressures may be supplied to the cylinders for operating the carriages 27 and 28 respectively. The control system embodiment as shown in FIG. 4 comprises a hydraulic control system in which a hydraulic pump 204 is operated by an electric-motor 206. Pump 204 draws its hydraulic fluid from reservoir 207 through line 208 and discharges fluid under pressure into main pressure line 209. A relief valve 210 is provided to limit the maximum pressure developed in line 209. Relief valve 210 is designed to relieve any excess pressure over a given value from line 209 and return the excess fluid through the line 217 to the sump. Thus valve 210 sets the pressure which pump 204 will maintain in line 209.

Line 209 branches into lines 218 and 219. Line 219 receives the full pressure of and is in effect a continuation of line 209. Line 218, however, has the flow of hydraulic fluid into it from line 209 restricted by orifice 220. A relief valve 221 is provided to limit the pressure within line 218. Relief valve 221 is set at a lower pressure than relief valve 210 and so limits the pressure attainable in line 218 to a lower pressure than that in lines 209 and 219. Relief valves 210 and 221 are maximum relief valves and as such limit the highest pressure which can be attained in lines 219 and 218 primarily for reasons of safety but also to provide a more uniform and reliable hydraulic pressure with which to operate the control system.

Line 218 connects to port 223, one of four ports 223, 224, 225 and 226 of a spring centered solenoid valve 222 activated by solenoids 228 and 231. Activation of solenoid 228 will connect port 223 with port 224 through the alignment therewith of passage 229, and port 225 with port 226 through the alignment therewith of passage 230. Activation of solenoid 231 will connect port 223 with port 225 through passage 232 and port 224 with port 226 through passage 233. As shown in FIG. 4 neither solenoid 228 nor solenoid 231 is activated and valve 222 is spring centered with its blank central portion opposite all of the ports 223, 224, 225 and 226 by means of springs 234 and 235.

Connecting with line 218 is line 236 which has two branches 237 and 238 which lead into adjustable relief valve 239. Adjustable relief valve 239 has mounted thereon adjustment knob 240 by which the pressure of spring 241 against valve body 242 may be adjusted. When the pressure in line 238 upon the end of valve body 242 is sufficient to overcome the pressure of spring 241 on the opposite end, valve body 242 will move to connect line 237 with line 243 through the alignment of passage 215 therewith and the excess pressure within line 236 and therefore 218 will be exhausted through valve 239 into line 243. Adjustable relief valve 239 has a range of operation such that any pressure from atmospheric to the maximum at which relief valve 221 is set may be set on adjustable relief valve 239 and the pressure in line 218 will thereafter be held at this value.

Line 243 connects with return line 244 through spring check valve 245 and line 246. Return line 244 returns the excess hydraulic fluid back to reservoir 207. Spring check valve 245 as shown may take the form of a ball check valve with a spring 247 behind the ball 248. Spring 247 constitutes biasing means tending to hold ball 248 against the seat of the valve until sufficient pressure builds up in line 243 to operate a pressure switch 249 which is connected to the line 243 through line 250 and which is connected into the electrical control system shown in FIG. 5 for a purpose which will be hereafter explained. Pressure switch 249 will be closed almost immediately after adjustable relief valve 239 opens when the pressure in line 218 equals that set on adjustable valve 239. It will, of course, be understood that line 218 being at a relatively elevated pressure and a relatively lower pressure being desired therein, adjustable relief valve 239 may be set to such lower pressure and the pressure in line 218 will then be adjusted to such lower pressure.

Connected to port 224 of solenoid valve 222 is line 251 which further connects with cylinder connecting line 252 which connects the head or expansion ends of cylinders 48 and 49. When solenoid 228 is activated valve 222 will be moved and port 223 will be connected to port 224 by passage 229 so that hydraulic fluid will pass from line 218 to lines 251 and 252 and into the head ends of cylinders 48 and 49 where it will press upon pistons 52 and 53 with the same pressure as is present in line 218 to move the pistons and urge the carriage assembly 27 shown in FIGS. 1 and 2 along its tracks with a total force dependent upon the pressure in line 251 and the total area of the two pistons 52 and 53.

In a similar manner line 219 leads to port 254 one of four ports 254, 255, 256 and 257 of a spring centered solenoid valve 253. Valve 253 is identical in all respects to spring centered solenoid valve 222 above described. Upon activation of solenoid 258 passage 260 will be aligned between and connect ports 254 and 255 of valve 253 and passage 261 will be aligned between and connect ports 256 and 257 of valve 253. Similarly upon activation of solenoid 259 passage 262 will connect ports 254 and 256 and passage 263 will connect ports 255 and 257. When ports 254 and 255 are connected hydraulic fluid may flow from line 219 into line 264 and then into cylinder connecting line 265 which connects the head ends of cylinders 50 and 51 to apply the fluid and pressure of line 219 against the pistons 54 and 55.

Adjustable relief valve 266 is comparable in all respects with adjustable relief valve 239 except that it will ordinarily during operation be adjusted to a higher pressure by adjustment knob 267 so that spring 268 will push valve body 269 more forcefully and it will require more pressure in line 270 to move valve body 269 to the left to align passage 271 with lines 272 and 273 in order to exhaust excess pressure through line 274 from line 219. Line 273 drains into return line 244 through spring check valve 275 and line 276. Spring check valve 275 is identical to spring check valve 245 and acts to establish sufficient pressure in line 273 to operate pressure switch 277 through line 278 when line 219 is up to pressure and valve 266 is exhausting.

As pressure is applied to the head or expansion ends of cylinders 48, 49, 50, and 51 and pistons 52, 53, 54, 55 are moved within the cylinders, fluid must be exhausted from the rod or contraction ends of the cylinders. This fluid from the rod ends of cylinders 48 and 50 passes into cylinder connecting line 279. The fluid from the rod ends of cylinders 49 and 51 passes into cylinder connecting line 280 and then from cylinder connecting line 280 through line 281 into cylinder connecting line 279 where it combines with the fluid from cylinders 48 and 50. From cylinder connecting line 279 the fluid from the rod ends of all the cylinders passes into line 282 and then divides, part passing into line 284 to port 225 and across to port 226 of solenoid valve 222, and the other part passing through line 283 to port 256 and across to port 257 of solenoid valve 253. From port 226 of solenoid valve 222 and from port 257 of solenoid valve 253 the fluid passes respectively into lines 285 and 286 and then into common return line 287 through which the fluid passes to reservoir 207.

During the retraction cycle of the prestresser hydraulic pressure must be applied to the rod ends of all the cylinders in order to urge the pistons back and move the two carriages toward each other. This is done by activating solenoids 231 and 259 in order to move the two solenoid valves 222 and 253 so that passage 232 connects port 223 with port 225 in valve 222 and passage 262 connects port 254 with port 256 in valve 253 so that hydraulic fluid will flow from the two pressure lines 218 and 219 through the respective valves into lines 284 and 283 respectively and then into common line 282 where the two hydraulic fluids under different pressures are combined and passed via cylinder connecting lines 279 and 280 into the rod or retraction ends of all the cylinders. Since it is of little moment at what pressure hydraulic fluid is presented to the pistons during the retraction cycle, so long as the pressure is sufficient to perform the retracting, it is quite satisfactory to combine the fluid from the two pressure lines 218 and 219 before applying it to the cylinders.

Figure 5:
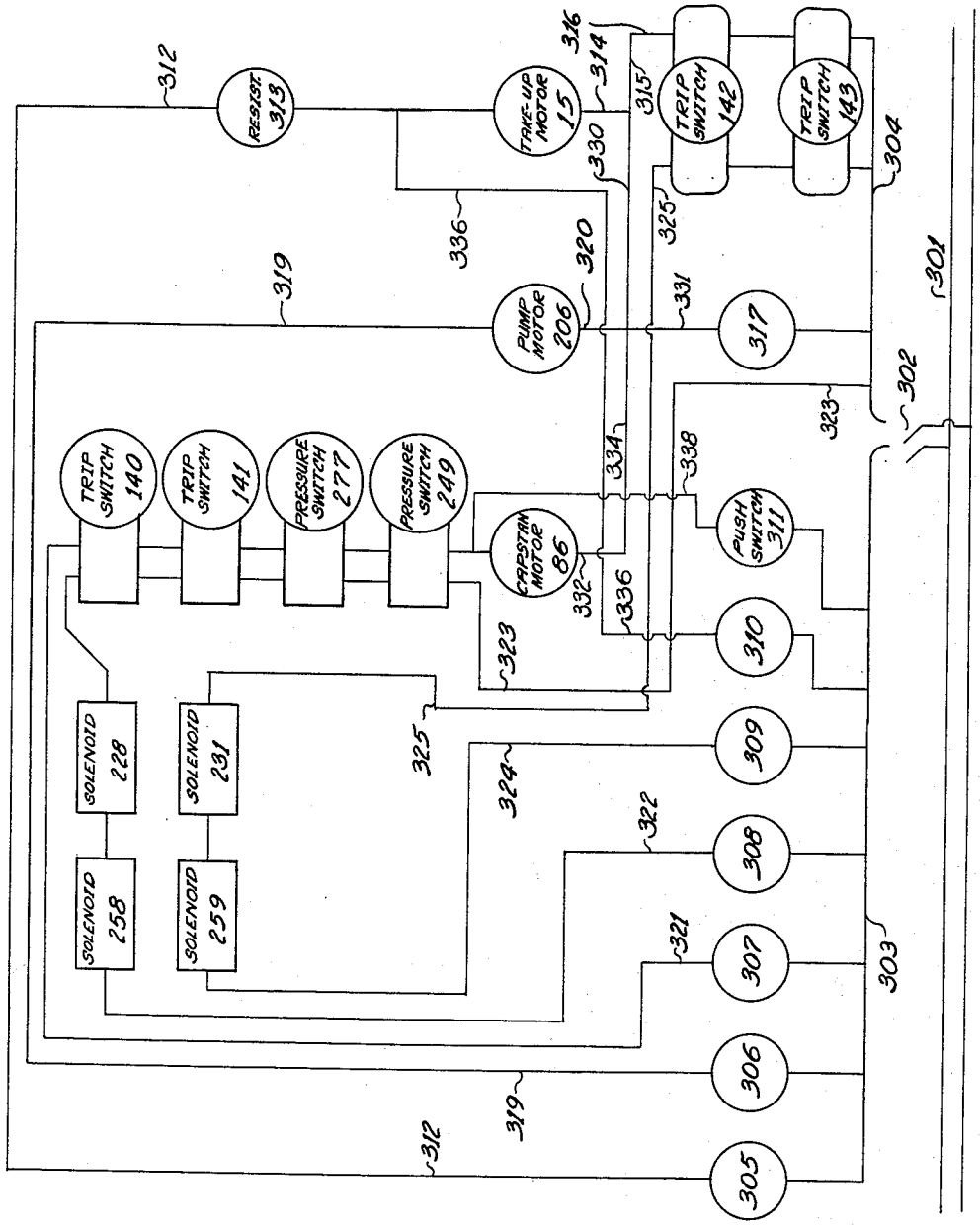
FIGURE 5 is a block diagram of the electrical control system used in conjunction with the hydraulic control system.

During the retraction cycle hydraulic fluid must be exhausted from the head or expansion ends of the cylinders. Fluid from the head ends of cylinders 48 and 49 passes into cylinder connecting line 252 then into line 251 to port 224 and across passage 233 to port 226 of solenoid valve 222 to line 285 which empties into return line 287. Fluid from the head ends of cylinders 50 and 51 passes into cylinder connecting line 265 and then passes into line 264 to port 255 across passage 263 to port 257 of solenoid valve 253 to line 286 which empties into return line 287. As illustrated diagrammatically in FIG. 4, solenoid valves 222 and 253 are spring centered so that when they are deenergized a blank central portion prevents communication between any of the ports 223, 224, 225 or 226 of valve 222 or ports 254, 255, 256 or 257 of valve 253. Solenoids 228 and 258 as shown in FIG. 5 are connected together in an electrical circuit which may be a simple loop circuit including a switch or button to make or break the circuit in the loop and a power source. Thus when the switch is closed solenoids 228 and 258 will both be activated at the same time and will move parallel passages 229, 230 and 260, 261 in solenoid valves 222 and 253 respectively and establish communication between ports 223 and 224, and between ports 225 and 226 of valve 222 and between ports 254 and 255, and 256 and 257 of valve 253. Similarly solenoids 231 and 259 are connected together in a loop circuit and upon activation of the circuit solenoids 231 and 259 will move crossed connections or passages of each valve and establish communication between ports 224 and 226, and 223 and 225 of valve 222 and ports 255 and 257, and 254 and 256 of valve 253. The electrical control circuit for the solenoids 228, 258, 231 and 259 is shown diagrammatically in FIG. 5, and hereafter described in connection with the electrical circuit. Briefly however, in this system pressure switches 249 and 277 are connected into the electrical leads to the drive motor 86 which drives the capstans so that as long as the pressure in lines 218 or 219 respectively is below the setting of valves 239 or 266, the pressure switches 249 or 277 will be open in the line to capstan motor 86 and the motor and capstans will not operate.

The electrical actuating circuit system shown diagrammatically in FIG. 5 is useful for controlling the operating mechanism of the prestressing apparatus, including the hydraulic control system shown in FIG. 4.

FIG. 5 shows a main switch 302 which connects two main power leads 303 and 304 to opposite poles of power line 301. Each of the circuits in the electrical system is completed from power lead 303 to power lead 304 through one of the switches 305, 306, 307, 308, 309, 310 or 311. Switch 305 completes a circuit from power lead 303 through line 312 and resistance 313 to motor 15 of take-up unit 14 and from motor 15 to power lead 304 through either trip switches 142 and 143 through line 314, 315 and 316, or through switch 317 through lines 314, 330 and 331 depending upon which switches are closed.

Switch 306 completes a circuit from power lead 303 through line 319 to motor 206 which drives hydraulic pump 204 shown on FIG. 4 and from motor 206 to power lead 304 through either trip switches 142 and 143 by way of lines 320, 330, 315 and 316 or through switch 317 by way of lines 320 and 331 depending upon which switches are closed.

Switch 307 completes a circuit from power lead 303 through line 321, trip switches 140 and 141 and pressure switches 277 and 249 to motor 86 which drives capstans 68 and 69 and from motor 86 to power lead 304 through trip switches 142 and 143 by way of lines 332, 334, 330, 315 and 316 or through switch 317 through lines 332, 334 and 331 depending upon which switches are closed.

Switch 308 completes a circuit from power lead 303 through line 322 to solenoids 258 and 228 and from solenoids 258 and 228 to power lead 304 through the trip switches 140 and 141 and also through the pressure switches 277 and 249 by way of line 323.

Switch 309 completes a circuit from power lead 303 through line 324 to solenoids 259 and 231 and from solenoids 259 and 231 to power lead 304 through trip switches 142 and 143 by way of line 325.

Switch 310 completes a circuit from power lead 303 to motor 15 through line 336 bypassing resistance 313. Switch 310 therefore completes the same circuit as switch 305 with the exception that resistance 313 is bypassed by the circuit through switch 310.

Spring push switch 311 if held down will complete a circuit to motor 86 through line 338 bypassing the two trip switches 140 and 141 and the two pressure switches 277 and 249, otherwise push switch 311 completes the same circuit as is completed by switch 307. By pushing switch 311 the operator may jog the capstan motor 86 even though the trip switches and pressure switches are open, but motor 86 will not continue to operate through switch 311 once the switch is released.

It will be understood that although one form of hydraulic control system and electrical control system has been illustrated and described other equivalent forms could be substituted to operate the prestresser.

With reference to the foregoing, the operation of the illustrated embodiment of the present invention will now be described.

Prior to initiating operation of the equipment the pistons 52, 53, 54, 55 of the prestresser unit 13 should be in retracted position so that carriages 27 and 28 are retracted to the central portion of the prestresser as shown in solid lines in FIGURE 2. The cable 12 to be prestressed, which it will be assumed is already wound on a reel held on pay-off device 11, is then partially paid off from the pay-off device 11 and after being passed around the drums 65 and 67 of the capstan 69 is strung between carriage assemblies 27 and 28 and then around the drums 64 and 66 of the capstan 68 to the take-up unit 14, as clearly shown in schematic form in FIGURE 3. The cable 12 first enters prestresser 13 through cable guide 97 then passes directly to the front portion of capstan drum 67, is passed from the top half way around the grooved face 67B of drum 67 in one groove thereof, and passed to the lower portion of capstan drum 65 where it passes half way around the grooved face 65B of capstan drum 65 into an adjacent groove of the grooved surface 67B of the drum 67 then back to drum 65 and so on between the drums. The grooved surfaces of the capstans are clearly shown in FIGURE 2. The cable is passed back and forth between the two capstan drums 65 and 67 between grooves of the grooved surfaces 65B and 67B until the cable reaches the outer or the last groove of drum 65 from the bottom of which it passes to and over the top of guide sheaves 104A to sheave 47 on carriage 28. Passing around sheave 47 the cable then passes to sheave 41 on carriage 27 thence back to sheave 46 on carriage 28, back to sheave 40 on carriage 27, to sheave 45 on carriage 28, to sheave 39 and so on back and forth between the sheaves of carriages 28 and 27 until it comes to and passes around sheave 42 on carriage 28 from which it passes over sheave 105A, as shown in FIG. 3 to capstan 68 where it passes back and forth between the grooved surfaces 64B and 66B around capstan drums 64 and 66 to the next to the last grooves thereof from which it passes to guide sheave 119 which guides the cable into straightener 111 from which the cable then passes back to and around the last grooves of capstan drums 64 and 66 and finally is directed from capstan 68 to cable guide 98 which guides the cable to take-up device 14.

It is quite possible to string the cable 12 through the prestresser 13 in other suitable patterns, for instance, the cable may be crossed between the sheaves in order to flex opposite sides of the cable outwardly. The manner of stringing the cable here described is the most usual with the present embodiment of the prestresser, however.

Prior to initiating any operation of the prestressing apparatus the 3 speed gear transmission 83 should be set to the speed at which it will be desired to operate the capstans. This speed will depend upon the power required to pull the particular size of cable to be prestressed.

The tension at which it is desired to prestress the cable having been previously determined the pressures to be applied to the two sets of pistons moving the carriages 27 and 28 will be set on the adjustable control valves 239 and 266, respectively.

For example, it has been determined that for certain types of seven-sixteenths inch cable a tension of 4800 pounds is required. The pressure which should be set on valve 239 and valve 266 to apply such a 4800 pound tension when using the five sheaves of carriage 27 and the six sheaves of carriage 28 may be found in the following manner. Since six sheaves are reeved on carriage 28 and five sheaves are reeved on carriage 27 carriage 28 will have 12 individual ropes or cable portions extending from it and carriage 27 will have 10 individual cables extending from it. The two pistons attached to each carriage have a combined head area of approximately 100 square inches. Thus any pressure in pounds per square inch applied to these pistons will force the attached carriage along its tracks with a total pressure of one hundred times the pressure per square inch supplied thereto from the pressure system.

Assuming that a 4800 pound tension is required for each cable as previously set forth herein, the five sheave carriage 27, which has ten individual cables to be tensioned, would require a total force of 48,000 pounds to tension the ten cables the desired amount and the six sheave carriage 28, which has twelve individual cables to be tensioned, would require a total force of 57,600 pounds to tension the twelve cables the same amount, and assuming that the total area of the two pistons of carriage 27 and the total area of the two pistons of carriage 28, respectively, are 100 square inches then it will be necessary to supply a fluid pressure of 480 p.s.i. to the cylinders 48 and 49 to operate the pistons 52 and 53 of carriage 27, and 576 p.s.i. to the cylinders 50 and 51 to operate the pistons 54 and 55 of carriage 28 so as to apply 4800 pounds tension to each of the cables on the carriages 27 and 28. The following formula is useful for determining the above requirements $$\frac{10 \text{ (number of cables on carriage)} \times 4800 \text{ (tension to be applied to each cable)}}{100 \text{ (area of pistons of carriage)}}$$
$$= 480 \text{ p.s.i. required to operate pistons of carriage with cables on five sheaves}$$

$$\frac{12 \text{ (number of cables on carriage)} \times 4800 \text{ (tension to be applied to each cable)}}{100 \text{ (area of pistons of carriage)}}$$
$$= 576 \text{ p.s.i. required to operate pistons of carriage with cables on six sheaves}$$

Therefore the control valve 239 which controls the pressure to cylinders 48 and 49 should be set at 480 p.s.i. and the control valve 266 which controls the pressure to cylinders 50 and 51 should be set at 576 p.s.i. to obtain equal pressures in opposite directions on each carriage.

If a higher tension is required on the cables than can be obtained by setting the control valves 239 and 266 to their upper limits when using all of the sheaves, then by using only a limited number of the sheaves on each carriage the pressure required to operate the carriages can be brought within the range of the control valves 239 and 266, for by using fewer sheaves fewer cable portions are stretched between the carriages 27 and 28 and therefore more tension can be placed on each single cable portion.

When the cable 12 has been strung through the prestresser 13 as described and secured to the reel in take-up 14, main switch 302 may be closed. Since the carriages 27 and 28 will be retracted all the way back as shown in solid lines in FIG. 2 the trip limit switches 142 and 143 will be open and in order to complete an electrical circuit to operate the apparatus it will be necessary to close switch 317. When switch 317 is closed, switch 306, if not already closed, is closed to operate motor 206 which drives hydraulic pump 204 and supplies fluid through the lines 209 to the lines 218 and 219. It will be seen from an examination of FIG. 5 that switch 306 may be closed first, if desired, and the result will be the same. Control valves 239 and 266 are now set to the respective desired pressures depending upon the size cable which is to be prestressed, the tension at which the cable is to be prestressed, and the number of sheaves on the carriages 27 and 28 around which the cable is to be passed.

The fluid in line 218 passes to port 223 of solenoid valve 222 but, since neither of the solenoids 228 or 231 are activated, solenoid valve 222 is spring centered in the closed position and no fluid will pass through it. The pressure in line 218 continues to build up until it reaches the pressure set on exhaust valve 239. When this pressure is exceeded slightly exhaust valve 239 will open and hydraulic fluid will be exhausted back to reservoir 207 through line 243, resistance check valve 245 and lines 246 and 244. Because of the back pressure created by resistance check valve 245 in line 243 between check valve 245 and exhaust valve 239 the pressure switch 249 will close. Pressure switch 277 on line 219 operates in the same manner. Pressure switches 277 and 249 are in the electrical circuit operating motor 86 which drives capstans 68 and 69 so that until switches 249 and 277 are closed the capstans cannot be operated. Switches 249 and 277 are also in the circuit operating solenoids 228 and 258 which control the operation of valves 222 and 253 so that the pistons 52, 53, 54 and 55 which are controlled by these valves cannot be operated until the pressure in their respective lines reaches that set on exhaust valves 239 and 266.

When the pressure in line 219 which goes to port 254 of solenoid valve 253 reaches that set on exhaust valve 266, exhaust valve 266 will open and the excess fluid will flow through it back to reservoir 207 through line 273, resistance check valve 275 and lines 276 and 244.

The operator having set a suitable control means such as an eddy current clutch, not shown, to the speed at which it is desired to operate the prestresser will now throw switch 307 which will allow electrical current to flow through trip switches 140 and 141, pressure switches 277 and 249 to motor 86 to drive capstans 68 and 69. At the same time he will throw switch 308 which will activate the solenoids 258 and 228. Pressure switches 277 and 249, also in this circuit, must be closed before solenoids 258 and 228 can be activated.

It will easily be understood that if switch 307 operating motor 86 and switch 308 operating solenoids 258 and 228 were closed beforehand, for instance, at the time the motor 206 was activated to operate pump 204 then motor 86 and solenoids 258 and 228 would not operate until the pressure in lines 218 and 219 had reached the pressure set on control valves 239 and 266 and pressure switches 249 and 277 had closed. Advantage may be taken of this sequence of events to cause the prestresser to start operating automatically as soon as sufficient pressure has been built up in the lines.

Meanwhile switch 305 may also have been closed in order to activate motor 15 which operates take-up 14 through a slipping clutch. Since the capstans 68 and 69 are not operating and there is no slack in the cable, motor 15 will operate but the clutch will slip and take-up 14 will not turn any more than is sufficient to tighten the cable around capstan 68.

When solenoids 228 and 258 are activated straight passageways 229, 230 and 260, 261 are moved in the solenoid valves 222 and 253 to connect ports 223 and 224, and ports 225 and 226, in valve 222 and ports 254 and 255 and 256 and 257 in valve 253. Then fluid from line 218 passes through the valve 222 from port 223 to 224 into line 251 to cylinder connecting line 252 to the expansion or head ends of cylinders 48 and 49. Thus a constant pressure will be put on pistons 52 and 53 in cylinders 48 and 49 and carriage 27 will be urged outwardly with a certain total force depending upon the setting of the control valve 239.

Similarly a higher constant pressure will be put upon the pistons 54 and 55 in cylinders 50 and 51 by fluid from line 219 through solenoid valve 253 through ports 254 to 255, line 264 and cylinder connecting line 265 to urge the carriage 28 outwardly with a total force depending upon the setting of the control valve 266.

As the pistons 52, 53, 54 and 55 are slowly forced outwardly, hydraulic fluid is forced from the rod ends of the four cylinders. The fluid from cylinders 48 and 50 passes into cylinder connecting line 279 and then through lines 282 and 284 to port 225 of valve 222 and through lines 282 and 283 to port 256 of valve 253. From ports 225 and 256 of valves 222 and 253 the fluid passes to ports 226 and 257 of the valves 222 and 253 and thence into lines 285 and 286, respectively, to line 287 where the two fluids are combined and conducted back to reservoir 207.

Since the capstans are driven from one drive system both capstans 68 and 69 rotate at the same peripheral speed. Once operating pressure is achieved in the pressure system and the pistons have been actuated and the capstans set in motion, the entering cable 12 will continue to be stretched as it is pulled through the prestresser by the capstans. Unless halted by the operator because the end of the cable has been reached, or for other reasons, this action will continue until the carriages 27 and 28 come to the end of their traverse when they will trip switches 140 and 141 which will open the circuits to the capstan drive motor 86 and to solenoids 258 and 228 to stop the feeding of cable through the prestresser and the application of pressure to the expansion ends of the pistons. When solenoids 258 and 228 are deactivated solenoid valves 222 and 253 are spring centered to closed position locking the pressure in the head ends of the cylinders and maintaining the cable under tension. Likewise if the power should fail for some reason during the run the valves 222 and 253 will be closed by the springs to maintain whatever pressure there is in the cylinders.

When the carriages 27 and 28 have come to the end of their traverse and the prestresser has been stopped, the carriages must be retracted to prepare for the next run. This is done by closing switch 309 which controls solenoids 259 and 231.

It will be understood that retraction of the carriages 28 and 27 may be made automatic by merely using trip switches 140 and 141 or providing other trip switches to close a suitable holding circuit which in turn will operate the circuit in which solenoids 259 and 231 are located so that when carriages 27 and 28 come to the end of their traverse the capstan motor 86 and solenoids 258 and 228 will not only be halted but solenoids 259 and 231 will be activated and the pistons 52, 53, 54 and 55 retracted in the manner which will now be explained.

Upon the activation of solenoids 259 and 231 crossed passageways 232 and 233, and 262 and 263 will be moved opposite the ports of both solenoid valves 222 and 253 so that port 224 is connected with port 226 and port 223 is connected with port 225 of valve 222 and in valve 253 port 255 is connected with port 257 and port 254 is connected with port 256. Hydraulic fluid will then flow through valve 253 from line 219 to lines 283 and 282, and through valve 222 from line 218 to line 284 which leads into line 282. Since the particular pressure under which the pistons retract is of no great moment it is acceptable for the two pressure systems to be connected in one line or a common circuit such as line 282 during the retraction cycle. Line 282 leads into cylinder connecting line 279 and cylinder connecting line 279 is connected to cylinder connecting line 280 by connecting line 281. Hydraulic fluid will be pumped into the retracting or rod ends of cylinders 48, 49, 50 and 51 through these various lines until the pistons 52, 53, 54 and 55 return the carriages 27 and 28 to the central portion of the prestressing apparatus. After trip switches 140 and 141 have interrupted the circuits to capstan motor 86 and to solenoids 258 and 228 the operator will open switches 307 and 308 to permanently open the respective circuits or else as soon as the carriages 27 and 28 had moved away from trip switches 140 and 141 motor 86 and solenoids 258 and 228 would be reactivated. If the operator should wish to jog the capstans at any time he may operate push switch 311.

As the pistons 52 and 53 are retracted, hydraulic fluid is exhausted from the head or expansion ends of the cylinders 48 and 49 through cylinder connecting line 252 and line 251 to port 224 of valve 222 and across to port 226, to line 285 and thence to return line 287. Likewise as pistons 54 and 55 are retracted at the same time as pistons 52 and 53, hydraulic fluid is exhausted from the head ends of cylinders 50 and 51 through cylinder connecting line 265 and line 264 to port 255 of solenoid valve 253, through the valve to port 257, and through line 286 to common return line 287 to be finally returned to the reservoir 207.

Since the circuit to solenoids 259 and 231 does not pass through pressure switches 277 and 249 these solenoids can be operated to maintain the contraction cycle even if the pressure in the systems should fall below that set on the exhaust valves 239 and 253 due to rapid retraction of the cable between the two carriages 27 and 28 and by the take-up 14.

The take-up device 14 is operating at all times as it is driven by motor 15 through a slip clutch. Since the clutch is designed to slip under any tension over a certain low operating value which is much less than the tension necessary to stretch the cable, the take-up has no effect on the cable during the prestressing cycle other than that of keeping the cable tight around the capstan 68. Likewise a brake on the pay-off 11 prevents the cable from paying off the pay-off 11 too fast as it is pulled by capstan 69 and also acts to keep the cable tight around capstan 69 so it will not slip. When the retraction cycle is begun, capstans 68 and 69 have already been stopped and capstan 69 remains stopped. The clutch 125, interposed between it and shaft 70, however, provides means to permit the capstan 68 to revolve freely as the take-up 15 continues to rotate to allow the cable to be pulled off the prestresser. The take-up 14 may be speeded up and its pull increased by operating switch 310 to by-pass resistance 313 which ordinarily limits the current fed to take-up motor 15.

After the carriages 27 and 28 have initially moved away from the limit switches 142 and 143 on the prestressing cycle at the beginning of operation, the operator will have opened switch 317 so that all of the current for motors 86, 206 and 15 has to pass through trip limit switches 142 and 143. These trip switches will remain closed until the carriages 27 and 28 return to their starting points when switches 142 and 143 will open breaking the circuits to pump motor 206 and take-up motor 15 to halt the entire prestressing apparatus, the capstan motor 86 already having been stopped.

Although the present invention has been described above in considerable detail the invention should not be limited narrowly to the exact and specific particulars disclosed and/or described as it will be understood that such substitutes, modifications or equivalents may be used as are included within the scope and spirit of the invention or pointed out in the appended claims.

We claim:

1. A prestressing apparatus for wire cable comprising two capstans, means for driving said capstans at equal peripheral speed to pass cable therebetween, two opposed sets of sheaves operatively mounted between the two capstans around and between which the cable is reeved as it passes from one capstan to the other, and means for effecting relative movement between said sets of sheaves to apply a constant force to the cable between the capstans thereby elongating the cable and to accumulate the amount by which the cable is elongated.

2. A method of prestressing cable material comprising passing the cable between two capstans rotating at equal peripheral speeds and around two opposed sets of sheaves between the capstans, effecting relative outward movement between said sets of sheaves by means of constant force applying means, thereby prestressing and elongating the cable and accumulating the amount by which the cable is elongated.

3. A prestressing apparatus comprising a frame, two capstans mounted thereon arranged to be driven at equal peripheral speeds to pass extended linear material therebetween, two carriages mounted upon the frame for movement away from each other, linear material engaging sheaves mounted upon the carriages, one of said capstans constituting a linear material delivering means to deliver linear material to the sheaves of said carriages and the other capstans constituting a linear material removing means to remove linear material from the sheaves, and fluid pressure operated means operatively connected to the carriages to urge the carriages away from each other with a constant predetermined force to prestress the linear material and collect and maintain between the sheaves of the two carriages for storage all of the cumulative elongation of the linear material passed through the device.

4. A prestressing apparatus for extended linear material comprising two series of spaced apart movable sheaves around and between which said extended linear material is passed, a first delivery capstan to deliver the linear material to the said sheaves, a second receiving capstan operating at the same peripheral speed as the delivery capstan to receive the extended linear material from the said sheaves, and pressure applying means operatively connected to said sheaves for continuously applying a constant force to each of said sheaves to continuously move the two series of sheaves apart to continuously and uniformly prestress said extended material and accumulate the amount by which the material is elongated.

5. A prestressing apparatus for a cable comprising a frame, tracks mounted on said frame, a cable feed capstan to be driven at a predetermined peripheral speed, a pair of carriages mounted on said tracks, cable receiving and storing means comprising a plurality of sheaves mounted on each of said carriages to receive cable from the cable feed capstan, force applying means mounted on said frame and operatively connected to said carriages to move said carriages in opposed directions to prestress and elongate said cable, and a cable receiving capstan operatively connected to said feed capstan and driven at the same peripheral speed as said cable feed capstan to pull the prestressed cable from the sheaves at the same rate as the cable is fed to the sheaves.

6. A prestressing apparatus comprising a frame, two capstans arranged to be driven at equal peripheral speeds to pass extended linear material therebetween, two movable carriages mounted upon the frame for movement away from each other, a plurality of material receiving sheaves mounted upon each of the carriages and predeterminable force applying means comprising pressure cylinders having pistons therein mounted upon the frame and connected to the carriages to urge said carriages with the sheaves away from each other, and a fluid pressure control system to maintain the supply of fluid pressure to the force applying means constant.

7. A prestressing apparatus for linear material, comprising a frame, a pair of capstans mounted thereon constituting a feed capstan and a receiving capstan, respectively, a drive for said capstans to rotate said capstans at equal peripheral speeds, said capstans including uniform material engaging surfaces to engage linear material passing therearound, a pair of movable carriages mounted upon said frame, a series of linear material engaging sheaves mounted on each of said carriages to receive loops of linear materials therearound, force applying means mounted on said frame and operatively connected to said carriages to move said carriages in opposition to each other to prestress the said material and control means for said force applying means to apply a constant predetermined force to the respective carriages and sheaves.

8. A prestressing apparatus comprising two movable groups of cable receiving sheaves disposed in spaced relation to each other, one of said groups comprising an odd number of sheaves and the other group comprising an even number of sheaves, means for continuously feeding cable to and removing cable from said groups of sheaves at the same rate, fluid operated force applying means operatively connected to each group of sheaves to move the two groups of sheaves in opposite directions to prestress the cable and automatic fluid pressure control means to control fluid to said force applying means at a constant pressure for each group in proportion to the number of sheaves in each group.

9. A prestressing apparatus comprising a frame, tracks mounted upon the frame, two capstans each consisting of two equal diameter drums, said drums being driven at an equal speed, two carriages mounted upon the tracks for movement away from each other, cable receiving sheaves mounted upon each of the carriages, one of said carriages having one more sheave than the other carriage, a plurality of cylinders mounted upon the frame having pistons therein connected to the respective carriages, predeterminable constant force applying means comprising fluid pressure means to apply predeterminable constant fluid pressure to the pistons in the cylinders to urge the said carriages with the sheaves away from each other and means to apply a greater total force to the carriage with the extra sheave than to the other carriage to equalize the pressure on said sheaves.

10. A prestressing device comprising a first constant speed capstan to draw cable from a cable supply, two carriages adapted for movement towards and away from each other, a series of cable receiving sheaves mounted upon each carriage to receive the cable from the first capstan, the series of cable receiving sheaves mounted upon one carriage containing one more cable receiving sheave than the series of cable receiving sheaves mounted upon the other carriage, independently adjustable constant force applying means to urge the respective carriages in opposite directions, said constant force applying means comprising means to apply a greater constant force to the carriage having the extra sheave mounted thereon to compensate for the unequal reactive forces occasioned by the additional sheave on one of the carriages, and a second constant speed capstan to draw the cable from the cable receiving sheaves, the first capstan and the second capstan being operatively connected to operate at the same constant speed.

11. A method of prestressing a length of wire cable comprising feeding the cable at the same selected rates into and out of a tortuous path including a plurality of loops, applying two independently controlled predeterminable constant balanced prestressing forces continuously outwardly to the loops in opposite directions to continuously prestress and elongate the cable a predetermined amount and continuously elongate the loops and continuously add to the cable initially in the tortuous path a length of cable equal to the elongation thereof, and retaining said added cable in the tortuous path until the entire length of cable has been prestressed.

References Cited in the file of this patent
UNITED STATES PATENTS
2,940,883   Pierce _____ June 14, 1960